United States Patent
Janssen et al.

(10) Patent No.: US 12,158,036 B2
(45) Date of Patent: Dec. 3, 2024

(54) DRIVE DEVICE FOR A PROTECTIVE HOOD AND METHOD FOR ADJUSTING A PROTECTIVE HOOD

(71) Applicant: Schaeffler Technologies AG & Co. KG, Herzogenaurach (DE)

(72) Inventors: Julius Janssen, Nuremberg (DE); Klaus Sattler, Diespeck (DE); Jan Hofmann, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 234 days.

(21) Appl. No.: 17/784,203

(22) PCT Filed: Nov. 5, 2020

(86) PCT No.: PCT/DE2020/100947
§ 371 (c)(1),
(2) Date: Jun. 10, 2022

(87) PCT Pub. No.: WO2021/115525
PCT Pub. Date: Jun. 17, 2021

(65) Prior Publication Data
US 2023/0032071 A1 Feb. 2, 2023

(30) Foreign Application Priority Data
Dec. 11, 2019 (DE) ...................... 10 2019 133 892.1

(51) Int. Cl.
*H02P 27/00* (2006.01)
*B24B 55/04* (2006.01)
*E05F 15/48* (2015.01)
*E05F 15/665* (2015.01)
*F16P 3/08* (2006.01)
*F16P 3/16* (2006.01)

(52) U.S. Cl.
CPC .............. *E05F 15/48* (2015.01); *B24B 55/04* (2013.01); *E05F 15/665* (2015.01); *F16P 3/08* (2013.01); *F16P 3/16* (2013.01)

(58) Field of Classification Search
CPC .............. H02P 6/14; B24B 55/04; F16P 3/08
See application file for complete search history.

(56) References Cited

U.S. PATENT DOCUMENTS

| | | | |
|---|---|---|---|
| 2,593,596 A | 4/1952 | Olson | |
| 2018/0245665 A1 | 8/2018 | Embrayages | |
| 2020/0009908 A1* | 1/2020 | Walthert | ................. F16D 41/36 |

FOREIGN PATENT DOCUMENTS

| | | |
|---|---|---|
| CN | 104117895 B | 2/2017 |
| DE | 6607587 U | 4/1971 |
| DE | 7133603 U | 6/1972 |
| DE | 9208537 U1 | 9/1992 |

(Continued)

*Primary Examiner* — Karen Masih

(57) ABSTRACT

A drive device for a protective hood of a machine includes a counterweight, a pulling means connecting the protective hood to the counterweight, a motor, and a freewheel. The freewheel connects the motor to the pulling means and is arranged to block when a weight force of the protective hood is greater than a weight force of the counterweight. The freewheel may be a linear freewheel or the freewheel may operate between two rotatable elements. The freewheel may be a frictionally locking freewheel or a positive locking freewheel.

18 Claims, 2 Drawing Sheets

(56) References Cited

FOREIGN PATENT DOCUMENTS

| | | |
|---|---|---|
| DE | 20021206 U1 | 3/2001 |
| DE | 202005005273 U1 | 10/2005 |
| DE | 102012219028 A1 | 5/2013 |
| DE | 202014101967 U1 | 7/2014 |
| DE | 102014222644 A1 | 5/2016 |
| DE | 202016002514 U1 | 5/2016 |
| DE | 202016006763 U1 | 12/2016 |
| DE | 102016217218 A1 | 3/2018 |
| DE | 102016225514 A1 * 6/2018 ............ E05F 15/643 |
| DE | 202018003076 U1 | 8/2018 |
| EP | 2682229 A2 | 1/2014 |
| EP | 3106738 A1 | 12/2016 |
| EP | 3343085 A1 | 7/2018 |
| WO | 2017025091 A1 | 2/2017 |

* cited by examiner

DRIVE DEVICE FOR A PROTECTIVE HOOD AND METHOD FOR ADJUSTING A PROTECTIVE HOOD

CROSS-REFERENCE TO RELATED APPLICATIONS

This application is the United States National Phase of PCT Appin. No. PCT/DE2020/100947 filed Nov. 5, 2020, which claims priority to German Application No. DE102019133892.1 filed Dec. 11, 2019, the entire disclosures of which are incorporated by reference herein.

TECHNICAL FIELD

The present disclosure relates to a drive device for a protective hood of a machine. The disclosure also relates to a method for the motorized adjustment of a protective hood of a machine that is partially relieved by a counter weight.

BACKGROUND

Machine tools with protective hoods are described, for example, in documents EP 2 682 229 A2 and DE 71 336 03 U. In the latter case, a protective hood is provided in addition to a tubular protective sleeve.

DE 92 08 537 U1 describes a press with a press plunger that can be moved against a workpiece, and a protective hood can be moved parallel to the direction of travel of the press plunger.

A circular saw described in U.S. 2,593,596 A includes a hood body which is loaded by spring tension or weight compensation and is intended to remain at any height above a machine table.

Various devices for moving and locking a safety door, which is arranged in front of a workstation to be secured, are disclosed in documents EP 3 106 738 A1 and EP 3 343 085 A1.

Other locking mechanisms for doors are described in the publications DE 20 2018 003 076 U1, DE 20 2016 006 763 U1 and DE 20 2014 101 967 U1.

A drive with weight compensation for vertically moving doors is known, for example, from DE 20 2016 002 514 U1. In this case, a tension element guided by a deflection pulley is connected on the one hand to a movable door leaf and on the other hand to a counter weight.

SUMMARY

The disclosure provides developments in the drive of protective hoods, which are arranged on machines, compared with the aforementioned prior art, both from the point of view of safety and from the point of view of production engineering. The disclosure describes a drive device and a method for motorized adjustment of a protective hood of a machine. Configurations and advantages explained below in connection with the adjustment method also apply accordingly to the drive device and vice versa.

The drive device is used for raising and lowering a protective hood of a machine and includes a motor. The motor cooperates with a pulling means via a freewheel, which is provided both for loading via the weight force of the protective hood and for loading via a counter weight. The freewheel is designed in such a way that it is blocked by a positive weight force difference between the protective hood and the counter weight.

In undisturbed operation, the mass of the protective hood introduces a force into the pulling means which is opposed to the force exerted by the counter weight. The drive device must overcome the differential force plus frictional forces when moving the protective hood. This also applies accordingly in cases where the weight force of the protective hood and/or the weight force of the counter weight acts on the pulling means via a transmission mechanism.

When the protective hood is lowered, it is pulled down by its own weight. The motor of the drive device acts as a brake in this case. If the protective hood reaches an obstacle which stops it, the freewheel opens if the motor continues to run. This means that in this state the motor is decoupled from the pulling means. This prevents the introduction of a driving torque or force from the motor into the pulling means.

In general, the method for the motorized adjustment of the protective hood partially relieved by the counter weight includes a freewheel connected between the motor, in particular the electric motor, and the protective hood. Both raising and lowering of the protective hood are performed with the freewheel blocked.

After the protective hood has been stopped by an obstacle and the freewheel has thus automatically opened, the protective hood can be raised again if necessary by reversing the direction of the motor drive. The freewheel automatically returns to its blocked position.

As a freewheel for the drive device, a linear freewheel is generally just as suitable as a freewheel acting between rotating elements. In both cases, the freewheel can be designed either as a frictionally locking freewheel, for example a clamping roller freewheel or sprag freewheel, or as a positive locking freewheel, e.g., a ratchet freewheel. If the freewheel acts between rotating elements, the freewheel can be arranged concentrically to a deflection wheel over which the pulling means is guided, for example in the form of an open toothed belt.

According to various further embodiments, a reduction gear is connected between the motor and the freewheel. In case of a linear drive, this can be a spindle drive, for example. If, on the other hand, the freewheeling effect exists between rotating elements, a wrap-around gear, for example a belt or chain drive, may be suitable as a reduction gear. A toothed gear is also suitable as a reduction gear.

Regardless of how the motor feeds power into the pulling means coupling the protective hood with the counter weight, this pulling means is designed as an open pulling means. Instead of a toothed belt, it can also be a chain, for example.

Optionally, an alarm device is provided which is triggered as soon as the protective hood moves against an obstacle. Such an alarm device can be integrated into the protective hood or attached to the protective hood. It is also possible to integrate the alarming device into the drive device. In this case, the alarm device detects an opening of the freewheel.

BRIEF DESCRIPTION OF THE DRAWINGS

Below, two exemplary embodiments are explained in more detail by means of a drawing. In the figures.

DETAILED DESCRIPTION

Figure 1:
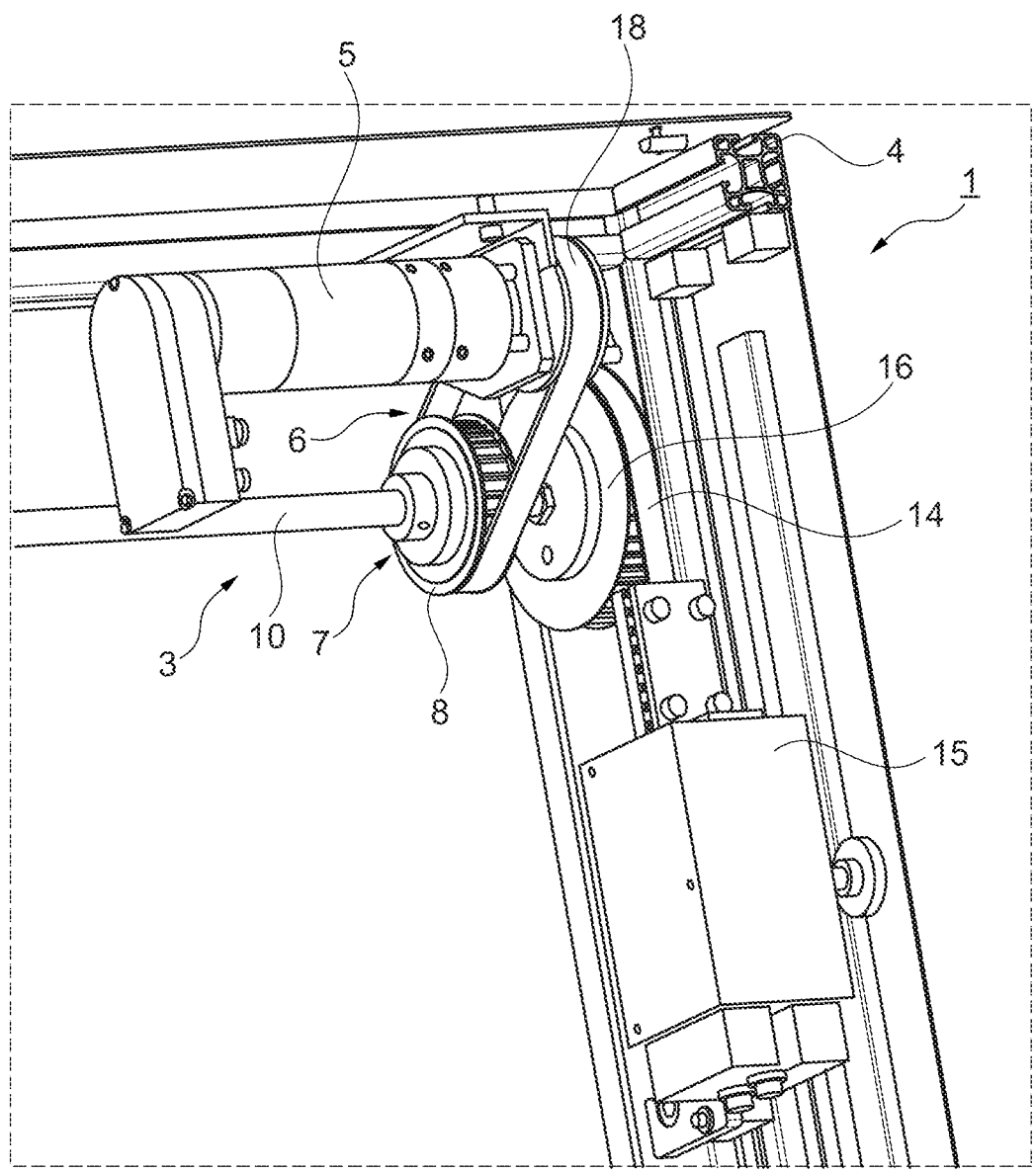
FIG. 1 shows a first exemplary embodiment of a drive device for a protective hood of a machine in a perspective view.

Unless otherwise stated, the following explanations relate to both exemplary embodiments. Parts that correspond to each other or have basically the same effect are marked with the same reference symbols in both figures.

A machine 1, by means of which a manual workstation is provided, includes a protective hood 2 for protecting the operator of the machine 1. A machine frame of the machine 1 is designated as 4. The protective hood 2 can be adjusted in a motorized manner by means of a drive device 3.

The drive device 3 includes an electric motor as the motor 5, which interacts with a freewheel 7, which is also to be attributed to the drive device 3, via a gear 6, which is designed as a reduction gear. A drive side element of the freewheel 7 is designated as 8, and a driven side element is designated as 9.

The motor 5 actuates a pulling means 14, which is an open toothed belt, via the gear 6 and the freewheel 7. The toothed belt 14 is loaded on its one end by the weight force of the protective hood 2 and on its other end by a counter weight 15. The load exerted by the protective hood 2 is greater than the load exerted by the counter weight 15, so that the protective hood 2 would move to its closed position, i.e., lower, without further forces. The resulting force acting on the protective hood 2 is less than half the weight force of the protective hood 2. This is equivalent to the fact that the mass of the protective hood 2 is largely, but not completely, compensated for by the counter weight 15.

In the exemplary embodiment according to FIG. 1, the gear 6 is designed as a wrap-around gear, namely a belt drive. A closed toothed belt of the belt drive 6 is designated as 18. The freewheel 7 operated via the belt drive 6 has a rotatable element 8, 9 on both the drive side and driven side. The elements 8, 9 of the freewheel 7 are arranged concentrically to a shaft 10, which is mounted in the machine frame 4. Furthermore, a deflection wheel 16, over which the open toothed belt 14 is guided, is arranged concentrically to the elements 8, 9 and thus to the entire freewheel 7. In this case, the freewheel 7 is designed as a clamping roller freewheel, i.e., a frictionally locking freewheel.

Figure 2:
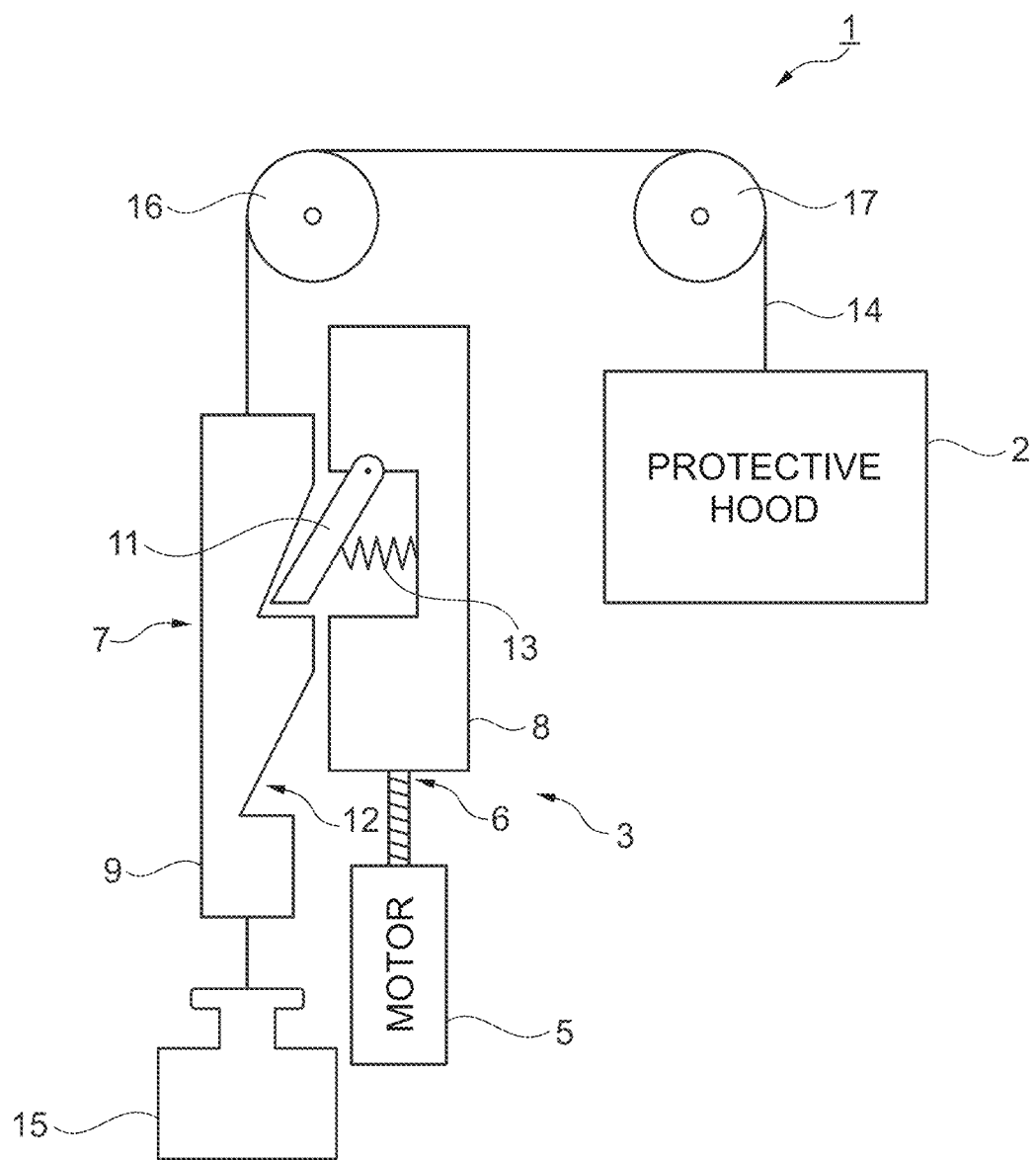
FIG. 2 shows a second exemplary embodiment of a drive device for a protective hood in a schematic view.

The exemplary embodiment according to FIG. 2 differs from the exemplary embodiment according to FIG. 1 with regard to the design of the freewheel 7: According to FIG. 2, the freewheel 7 is designed as a ratchet freewheel, i.e., a positive locking freewheel. In the present case, the freewheel 7 is a linear freewheel, i.e., a freewheel in which the driving element 8 and the driven element 9 are linearly movable. A blocking pawl 11 loaded by a spring element 13 engages in a blocking contour 12 when the freewheel 7 is blocked.

Just as in the exemplary embodiment according to FIG. 1, the open toothed belt 14 runs over a deflection wheel 16 in the exemplary embodiment according to FIG. 2, but, exclusively in the configuration according to FIG. 1, a torque can be introduced into the deflection wheel 16. In the arrangement according to FIG. 2, a second deflection wheel 17, over which the pulling means 14 is guided, can be seen.

In both exemplary embodiments, both raising and lowering of the protective hood 2 is performed with the freewheel 7 blocked. This applies as long as the movement of the protective hood 2 is not disturbed, for example by an obstacle located in the adjustment path. If the protective hood 2 encounters an obstacle during its downward movement, the obstacle represents a relief of the weight force of the protective hood 2. The positive weight force difference between the protective hood 2 and the counter weight 15, which is a prerequisite for blocking the freewheel 7, thus disappears. When the motor 5 continues to run, the freewheel 7 therefore opens, and the protective hood 2 resting on the obstacle only loads it with the weight force difference existing between the protective hood 2 and the counter weight. The protective function of the freewheel 7 is thus implemented in a mechanical manner.

REFERENCE NUMERALS

1 Machine
2 Protective hood
3 Drive device
4 Machine frame
5 Motor
6 Gear
7 Freewheel
8 Drive side element of the freewheel
9 Driven side element of the freewheel
10 Shaft
11 Blocking pawl
12 Blocking contour
13 Spring element
14 Pulling means, open toothed belt
15 Counter weight
16 Deflection wheel
17 Deflection wheel
18 Closed toothed belt

The invention claimed is:

1. A drive device for a protective hood of a machine, comprising a motor, which cooperates with a pulling means via a freewheel, the pulling means being loaded on one end by a weight force of the protective hood and on its other end by a movable counter weight, wherein the freewheel is designed in such a way that it is blocked by a positive weight force difference between the protective hood and the counter weight.

2. The drive device according to claim 1, wherein the freewheel is designed as a linear freewheel.

3. The drive device according to claim 1, wherein the freewheel is designed as a freewheel effective between two rotatable elements.

4. The drive device according to claim 1, wherein the freewheel is designed as a frictionally locking freewheel, in particular a clamping roller freewheel.

5. The drive device according to claim 1, wherein the freewheel is designed as a positive locking freewheel, in particular a ratchet freewheel.

6. The drive device according claim 1, further comprising a reduction gear connected between the motor and the freewheel.

7. The drive device according to claim 3, wherein the freewheel is arranged concentrically to a deflection wheel over which the pulling means is guided.

8. The drive device according to claim 1, wherein an open toothed belt is provided as the pulling means.

9. A method for the motorized adjustment of a protective hood of a machine which is partially relieved by a movable counter weight, comprising:
    connecting a freewheel between a motor and the protective hood; and
    blocking the freewheel; and
    raising and lowering of the protective hood via a belt loaded on one end by a weight force of the protective hood and on its other end by the counter weight.

10. The method according to claim 9, wherein the freewheel opens as soon as the protective hood is stopped by an obstacle during lowering.

11. A drive device for a protective hood of a machine, comprising:
    a movable counterweight;

an open toothed belt connected to the protective hood at one end and to the counterweight at an opposite end;
a motor; and
a freewheel connecting the motor to the pulling means and arranged to block when a weight force of the protective hood is greater than a weight force of the counterweight.

12. The drive device of claim 11 wherein the freewheel is a linear freewheel.

13. The drive device of claim 11 wherein the freewheel operates between two rotatable elements.

14. The drive device of claim 13 wherein the freewheel is a clamping roller freewheel or a ratchet freewheel.

15. The drive device of claim 11 further comprising a reduction gear that connects the motor to the freewheel.

16. The drive device of claim 11 further comprising a deflection wheel, wherein:
the freewheel is arranged concentrically to the deflection wheel; and
the pulling means is guided over the deflection wheel.

17. The drive device of claim 11 wherein the pulling means is an open toothed belt.

18. The drive device of claim 11 wherein the freewheel is a frictionally locking freewheel or a positive locking freewheel.

* * * * *